United States Patent
Caserta (10) Patent No.: US 11,019,485 B2
(45) Date of Patent: May 25, 2021

(54) METHOD FOR SHARING A MOBILE OPERATOR PROFILE IN INTEGRATED CIRCUIT CARDS, AND CORRESPONDING SYSTEM AND COMPUTER PROGRAM PRODUCT

(71) Applicant: STMicroelectronics S.r.l., Agrate Brianza (IT)

(72) Inventor: Francesco Caserta, Naples (IT)

(73) Assignee: STMICROELECTRONICS S.R.L., Agrate Brianza (IT)

(*) Notice: Subject to any disclaimer, the term of this patent is extended or adjusted under 35 U.S.C. 154(b) by 0 days.

(21) Appl. No.: 16/781,278

(22) Filed: Feb. 4, 2020

(65) Prior Publication Data

US 2020/0252790 A1 Aug. 6, 2020

(30) Foreign Application Priority Data

Feb. 5, 2019 (IT) .................. 102019000001669

(51) Int. Cl.
*H04W 8/24* (2009.01)
*H04W 8/04* (2009.01)
*H04W 8/06* (2009.01)
*H04W 8/20* (2009.01)
*H04W 12/065* (2021.01)

(52) U.S. Cl.
CPC ............. *H04W 8/245* (2013.01); *H04W 8/04* (2013.01); *H04W 8/06* (2013.01); *H04W 8/205* (2013.01); *H04W 12/065* (2021.01)

(58) Field of Classification Search
CPC ... H04W 8/245; H04W 12/0605; H04W 8/04; H04W 8/06; H04W 8/205
See application file for complete search history.

(56) References Cited

U.S. PATENT DOCUMENTS

| 10,187,784 | B1* | 1/2019 | Chen | H04W 12/06 |
| 2010/0085937 | A1* | 4/2010 | Pressley | H04W 8/06 370/331 |
| 2015/0334552 | A1 | 11/2015 | Li et al. | |
| 2016/0050557 | A1* | 2/2016 | Park | H04W 8/205 455/419 |
| 2017/0332312 | A1* | 11/2017 | Jung | H04W 12/06 |
| 2018/0191728 | A1 | 7/2018 | Kim et al. | |

OTHER PUBLICATIONS

GSM Association "Official Document—12FAST.15—Remote Provisioning Architecture for Embedded UICC", Technical Specification, Version 1.0, Dec. 17, 2013, 294 pages.

* cited by examiner

*Primary Examiner* — Dinh Nguyen
(74) *Attorney, Agent, or Firm* — Slater Matsil, LLP (57) ABSTRACT

A method for sharing a same profile on different integrated circuit cards includes performing a profile enable procedure for a first profile on a first mobile device; performing a mobile device authentication procedure between the first mobile device and the mobile network; and performing by the mobile network, a location update operation using identifier information including subscriber information.

20 Claims, 9 Drawing Sheets

METHOD FOR SHARING A MOBILE OPERATOR PROFILE IN INTEGRATED CIRCUIT CARDS, AND CORRESPONDING SYSTEM AND COMPUTER PROGRAM PRODUCT

This application claims priority to Italian Patent Application No. 102019000001669, filed on Feb. 5, 2019, which application is hereby incorporated herein by reference.

TECHNICAL FIELD

Embodiments of the present disclosure relate to solutions for sharing a same profile on different integrated circuit cards.

BACKGROUND

Due to new requirements of miniaturization and robustness, the industry has developed an evolution of the traditional UICC (Universal Integrated Circuit Card) cards called "embedded UICC". This evolution envisages that the UICC is soldered (or in any case made hardly accessible) in the hosting device that can be a mobile phone, a modem, a board inserted in a device, etc.

Soldering presents distinct advantages such as the possibility of reducing the size of the UICC device and hence of the modem, the improvement of the robustness of the contacts (soldered contacts are typically more reliable than interfaces between replaceable components), the increased antitheft protection. On the other hand, soldering a UICC (or making it hardly accessible) introduces new requirements and issues that need to be addressed. For example, as the UICC is not replaceable, means should be available to allow an operator change. Also, specific operations (such as device repairing), that today are typically performed after the UICC removal, require a way to disable the SIM card.

To address the above requirements, the industry has defined a new technological standard called "embedded UICC" or "Remote SIM provisioning". The basic concepts of this new technological standard are the following. One entity is defined to allow the download/enable/delete of profiles (for instance the Issuer Secure Domain Root ISD-R, see for instance "Remote Provisioning Architecture for Embedded UICC, Technical Specification, Version 1.0, 17 Dec. 2013"); the UICC may contain several mobile network operator subscriptions; each operator subscription is represented by a "profile"; and every profile may be seen as a container; the container is managed by a security domain (for instance the Issuer Secure Domain Profile ISD-P).

SUMMARY

In accordance with an embodiment, a method for sharing a same profile on different integrated circuit cards includes performing a profile enable procedure for a first profile on a first mobile device, performing the profile enable procedure including sending identifier information from the first mobile device to a mobile network, wherein the identifier information includes subscriber information, wherein the first profile is stored on the first mobile device and on a second mobile device, and wherein the first profile is disabled on the first mobile device and enabled on the second mobile device prior to performing the profile enable procedure; performing a mobile device authentication procedure between the first mobile device and the mobile network; and performing by the mobile network, a location update operation using the identifier information including the subscriber information, wherein the location update operation includes performing a cancellation of a location of the second mobile device.

In accordance with another embodiment, a mobile device includes a first processor and a first-non-transitory machine readable medium readable medium having stored thereon a first program having program code for performing the following steps: transmitting an enable request to an integrated circuit card, receiving an enable response from the integrated circuit card, transmitting an attach request to a mobile network, the attach request comprising a subscriber identifier; and the integrated circuit card comprising a second processor, and a second non-transitory machine readable medium readable medium having stored thereon a second program having program code for performing the following steps: receiving the enable request from the first processor, and enabling a first profile stored on the integrated circuit card in response to the enable request, and transmitting the enable response to the first processor.

In accordance with a further embodiment, a method of operating a mobile network, the method includes receiving an attach request from a first mobile device having a first profile stored thereon, the attach request comprising subscriber information; transmitting an authentication information request to an HSS in response to receiving the attach request; receiving an authentication information response from the HSS, the authentication information response comprising authentication vectors relating to the subscriber information; transmitting an update location request to the HSS requesting to update a location associated with the first mobile device and the subscriber information; receiving an update location response from the HSS; and transmitting an attach reject message to a second mobile device having the first profile stored thereon.

BRIEF DESCRIPTION OF THE DRAWINGS

Embodiments of the present disclosure will now be described with reference to the annexed drawings, which are provided purely by way of non-limiting example and in which.

DETAILED DESCRIPTION OF ILLUSTRATIVE EMBODIMENTS

In the following description, numerous specific details are given to provide a thorough understanding of embodiments.

The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
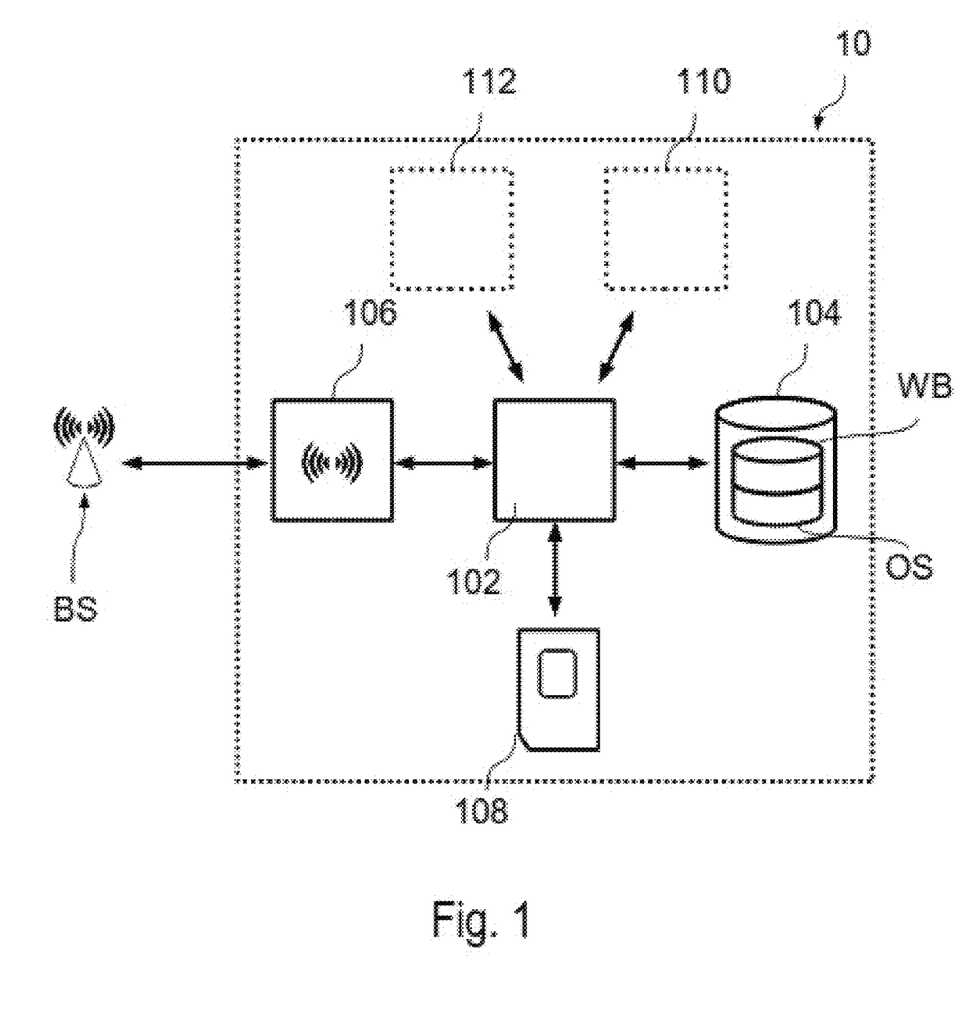
FIG. 1 illustrates a block diagram of a mobile device.

FIG. 1 shows a possible architecture of a "user equipment" 10, such as a mobile device, e.g. a smartphone or a tablet, or a mobile communication module usually to be used in embedded systems.

Generally, the device 10 includes one or more processors 102 connected to one or more memories 104. The device 10 comprises moreover at least one mobile communication interface 106 for communication with a base station BS. For example, the mobile communication interface 106 may include a GSM (Global System for Mobile Communications), CDMA (Code Division Multiple Access) transceiver, W-CDMA (Wideband Code Division Multiple Access), UMTS (Universal Mobile Telecommunications System), HSPA (High-Speed Packet Access) and/or LTE (Long Term Evolution) transceiver.

A mobile device also often includes a user interface 110, such as a touchscreen. Conversely, a communication module to be used, e.g., in embedded systems, such as alarm systems, gas meters or other types of remote monitoring and/or control systems, often does not comprise a user interface 110, but a communication interface 112 in order to exchange data with a further processing unit of an embedded system. For example, in this case, the interface 112 may be a digital communication interface, such as a UART (Universal Asynchronous Receiver-Transmitter), SPI (Serial Peripheral Interface) and/or USB (Universal Serial Bus) communication interface. Generally, the processing unit 102 may also be directly the main processor of an embedded system. In this case the interface 112 may be used to exchange data with one or more sensors and/or actuators. For example, in this case, the interface 112 may be implemented by one or more analog interfaces and/or digital input/output ports of the processing unit 102.

Memory 104 may store, for example, an operating system OS being executed by the processor 102 and which manages the general functions of the device 10, such as the management of the user interface 110 and/or the communication interface 112 and the establishment of a connection to the base station BS via the interface 106. The memory 104 may also contain applications being executed by the operating system OS. For example, in the case of a mobile device, the memory 104 often comprises a web browser application WB.

For establishing a connection with the base station BS, the device 10 is coupled to a processing unit 108 configured to manage the identity identification of the user. For example, a mobile device usually includes a card holder for receiving a card comprising a Subscriber Identity Module (SIM), which is usually called SIM card. Generally a corresponding SIM module may also be installed directly within the device 10. In the example of FIG. 1, a Universal Integrated Circuit Card (UICC) 108, which is a smart card often used in GSM and UMTS networks. The UICC ensures the integrity and security of all kinds of personal data and typically holds a few hundred kilobytes. Also a UICC may be integrated directly in the device 10 and is in this case often called embedded UICC (eUICC).

For example, in a GSM network, the UICC 108 contains a SIM application, and in a UMTS network the UICC 108 contains a USIM application. A UICC may contain several applications, making it possible for the same smart card to give access to both GSM and UMTS networks, and may also provide storage of a phone book and other applications.

Accordingly, the reference to a SIM module in the following of the present description is intended to include both 2G, 3G, 4G and 5G SIM modules and further generations of mobile communications to which the solution here described is applicable. Such reference applies also the case in which such a SIM module is provided on a SIM card.

Figure 2:
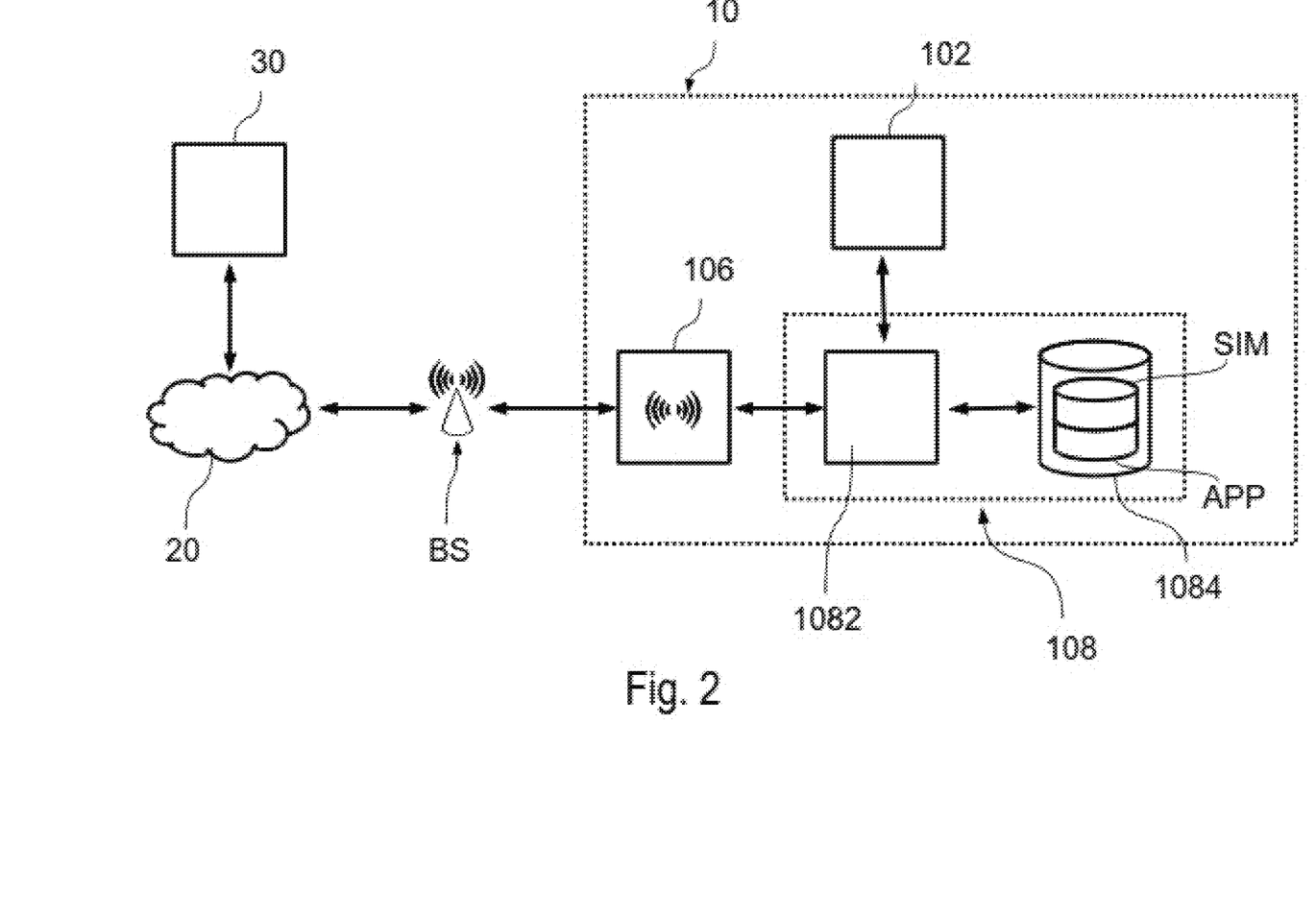
FIG. 2 illustrates a block diagram of a further mobile device.

As shown in FIG. 2, a SIM module 108 often comprises one and more processors 1082 and one or more memories 1084 for executing applications stored in the memory 1084 of the module 108. For example, the SIM module 108 may include in addition to the Subscriber Identity Module application (reference sign SIM in FIG. 2) at least one further application APP. For example, this application APP may be configured to communicate (directly, or indirectly via the processor 102 and possibly the operating system OS) with the mobile communication interface 106 in order to send data to and/or receive data from a remote host 30. For this purpose, the host 30 may be connected via a network 20, such as a Local Area Network (LAN) or a Wide Area Network (WAN), such as the internet, to the base station BS. Accordingly, connection between the host 30 and the UICC 108 may be established by the network 20, the base station BS and the communication interface 108. Generally, the communication may be initiated by the host 30 or the UICC 108. For example, the application APP may be a web server application, which receives requests from the web browser WB of a mobile device 10 and obtains respective content from a remote host 30, such as a web server. The application APP may also be an authentication application. In this case, the host 30 may send an authentication request to the UICC 108 and the UICC 108 may send an authentication response to the host 30.

Figure 3:
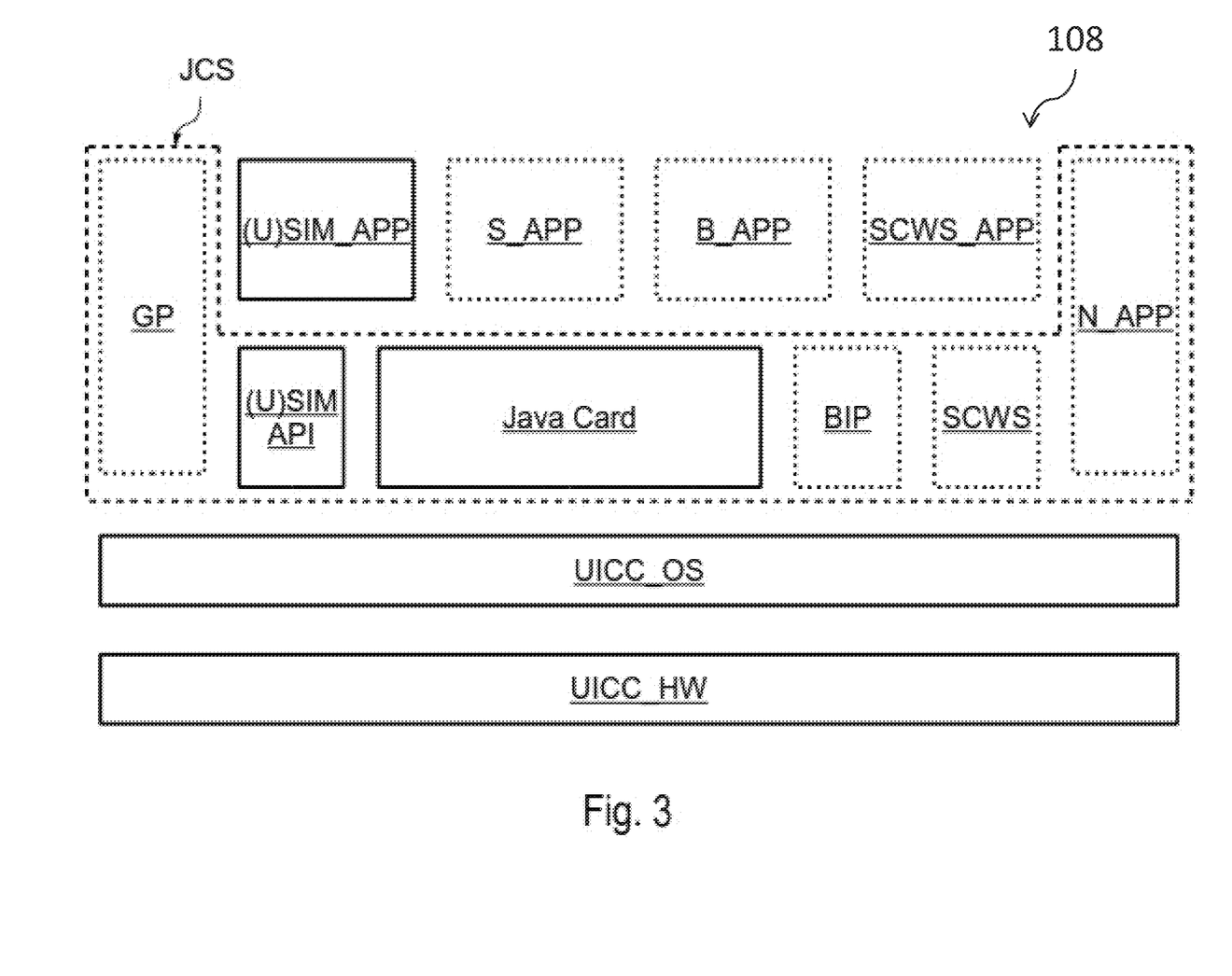
FIG. 3 illustrates a block diagram of a software architecture of a UICC card.

FIG. 3 shows in this respect a typical architecture of the software layers of a UICC card. Substantially, a UICC 108 comprises a hardware layer UICC_HW being represented (at least) by the processor 1082 and the memory 1084. On top of the hardware layer UICC_HW runs an operating system UICC_OS of the UICC card. Generally, the operating system UICC_OS may manage a plurality of applications. For example, in the example considered, a Java Card System JCS is executed by the operating system UICC_OS, which manages and runs applets, i.e. applications using the APIs (Application Programming Interface) provided by the Java Card System JCS.

For example, the Java Card System JCS comprises usually a SIM and/or USIM API (identified with the reference sign (U)SIM API) which manages the basic Subscriber Identity Module commands and provides functions to higher level SIM or USIM applets (identified with the reference sign (U)SIM_APP).

Generally, the communication with the remote host 30 may be performed via short messages of the Short Message Service (SMS) and/or by a Bearer Independent Protocol (BIP), such as GPRS, EDGE, or UMTS. The Java Card™ Platform provides a JAVA™ runtime environment, which is particularly optimized for smart cards. This technology is well known to those skilled in the art, rendering a more detailed description herein superfluous.

Often the Java Card System JCS comprises a GlobalPlatform module GP according to the "GlobalPlatform Card specification", e.g. version 2.2.1. Also this standard is well known to those skilled in the art, rendering a more detailed description herein superfluous. Basically, the GP module provides features such as user authentication through secure channels, or the installation and remote management of the applets. For example, one of the possible encryption mechanisms managed by the GP module may be the SCP (Secure Channel Protocol) 80 specified in the technical specification ETSI TS 102 225 "Smart Cards; Secured packet structure for UICC based applications", e.g. version 9.0.0.

The above mentioned API functions may then be used by applets, such as the SIM or USIM applet (U)SIM_APP, a basic applet B_APP and/or a secure applet S_APP.

The UICC 108 may comprise also further applications, such as a Smart Card Web Server SCWS and possible Web server applets SCWS_APP, which e.g. perform the above mentioned web server function.

Generally, the UICC 108 may comprise not only custom applets but also native low level applications N_APP being executed directly by the operating system UICC_OS.

A typical communication between the remote host 30 and the card 108, 108a is performed by using the remote management protocol, such as the SCP 80 protocol as specified in the technical specifications ETSI TS 102 225 "Smart Cards; Secured packet structure for UICC based applications", e.g. version 9.0.0, and in particular in ETSI TS 102 226 "Smart Cards; Remote APDU structure for UICC based applications", e.g. version 9.2.0. The remote host 30 may send a command, i.e. a Command Application Protocol Data Unit C-APDU, to an application installed on the UICC 108, 108a and receive from the application a respective response, i.e. a Response Application Protocol Data Unit R-APDU.

For example, the host may send the command C-APDU to a Short Message Service—Service Centre, which sends a short message to the mobile device. The Short Message Service sends the command C-APDU, possibly SCP80 encrypted a SMS message, transmitted by the base station BS to the device 10. The device 10 may recognize that the short message contains a remote management message, e.g. a SCP80 packet, and send the latter to the UICC 108 by a so called ENVELOPE. The UICC 108, possibly by using the functions provided by the operating system UICC_OS and the Java Card System JCS, determines the content of the SMS message, e.g. if required the UICC may decrypt the message, and forwards the content C-APDU to the target application. In order to forward the C-APDU, the UICC 108 identifies the corresponding target application using a for instance a TAR (Toolkit Application Reference) code, consisting e.g. of 3 bytes, associated with each applications installed in the UICC. Accordingly, it is sufficient to include the TAR code of the target application in the short message sent to the UICC 108, e.g. in the short message header or the SCP80 packet, and the UICC has only to compare the TAR code received with the various TAR codes of the applications installed in the UICC.

Generally, instead of using short messages, any other communication could be used for exchanging remote management messages with an integrated circuit card 108, such as a communication based on the IP protocol, e.g. the TCP (Transmission Control Protocol) or UDP (User Datagram Protocol) protocol.

UICC cards, in particular SIM modules, can also have installed applications provided by different mobile phone operators, i.e. a so called multi-subscription SIM, which is preferably an embedded multi-subscription SIM module, preferably a multi-subscription eUICC. For example, such multi-subscription SIM modules may be used as embedded SIM modules, e.g. eUICC, or as SIM cards to be installed in automated machines, which often are not easily reachable, such as remote monitoring and/or control systems, such as a gas meters.

Figure 4:
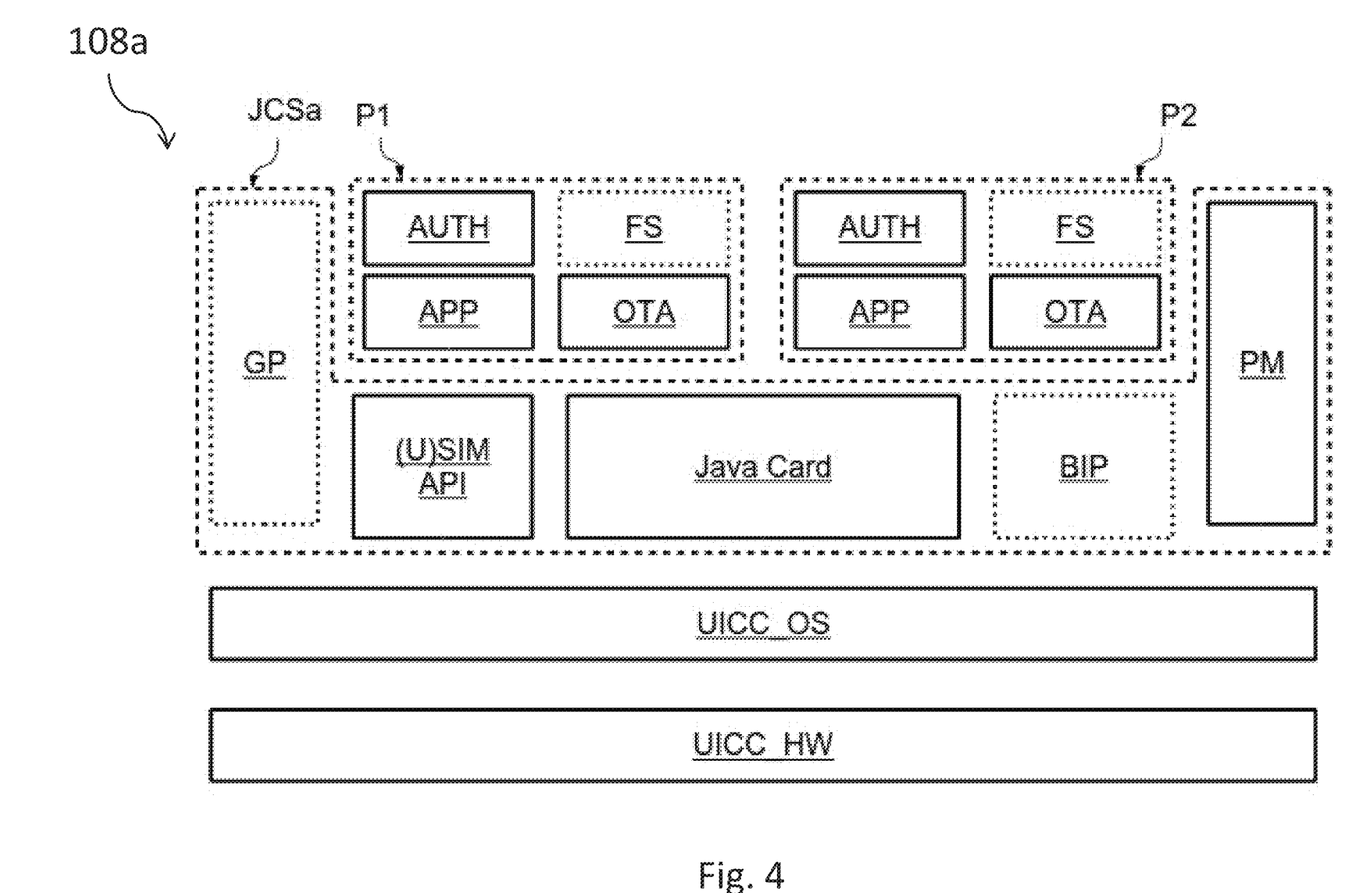
FIG. 4 illustrates software architecture of a multi-subscription SIM module.

FIG. 4 shows an embodiment of a multi-subscription SIM module 108a, which comprises the same modules and components shown with respect to FIG. 2.

In the embodiment considered, the SIM module 108a supports at least two profiles P1 and P2 of two mobile network operators. In general the SIM module 108a can support also more than two profiles, i.e. a plurality of profiles.

For example, in the embodiments considered, the software architecture is based on the Java Card System described with respect to FIG. 3. For example, also in this case, a Java Card System JCSa is executed by an operating system UICC_OS, which manages and runs applets, i.e. applications using the APIs (Application Programming Interface) provided by the Java Card System JCSa. For example, the Java Card System JCS may comprise a SIM and/or USIM API (identified with the reference sign (U)SIM API) which manages the basic Subscriber Identity Module commands and provides functions to higher level SIM and/or USIM applets. Moreover, the Java Card™ Platform may provide a JAVA™ runtime environment. In an embodiment, the Java Card System JCSa may also comprises a GlobalPlatform module GP according to the "GlobalPlatform Card specification", e.g. version 2.2.1. The above mentioned API functions may then be used by the applets, such as the SIM and/or USIM applet (U)SIM_APP, a basic applet B_APP and/or a secure applet S_APP.

Each profile P1/P2 is represented by a memory area in the memory 1084 of the SIM card for storing applets APP, such as a respective (U)SIM_APP applet for each profile P1/P2. In the memory area may also be stored the respective authentication data AUTH of the SIM card used to access the mobile network of the mobile network operator. In various embodiments, each profile P1/P2 may also have associated a respective Over The Air (OTA) Key, which are usually used to encrypt (e.g. according to the SCP80 protocol) the remote management commands sent by a mobile network operator to a given SIM card.

In various embodiments, each profile P1/P2 may have associated a respective file system area FS, e.g. in order to store user data, such as the user's contact list, or the above mentioned preferred roaming partner list.

Generally, while the profile data have been shown in the applet/application layer, each profile may also comprise applications and/or API in the Java Card System JCSa. Moreover, the profile data may also include configuration data which influence directly the API layer.

The multi-subscription SIM module 108a may comprise moreover a profile manager application PM, for example provided in the API layer, or at the applet layer, or distributed between the API and the applet layers.

The memory of the UICC may contain also a configuration application configured for communicating with such profile manager of the SIM module 108a in order to manage the profiles installed in the SIM module 108a. For example, in some embodiments, such application is configured for communicating with the profile manager PM in order to select or enable one of the profiles P1/P2 installed in the SIM card 108a. For example, in an embodiment, the SIM module 108a may have preinstalled the profiles of a plurality of mobile network operators and when the device 10 is started for the first time (or generally during a configuration phase), the user may activate by the configuration application one of the of the profiles.

In some embodiments, the configuration application may be configured to install and/or update a profile in the SIM module 108a. For example, the application may access a remote host in order to download a list of mobile network operators. Next the configuration application may be used to subscribe to one of the mobile network operators and obtain the respective profile data, which may then be loaded on the SIM module 108a by the configuration application and the profile manager.

Thus, several profiles can be present concurrently on the same card representing several operators. Only one profile can be enabled at any given time, all the others being disabled. Enablement of the profile of a determined MNO may be necessary also if the eUICC or UICC card is not of the multi-subscription type, i.e. the eUICC or UICC card stores or is configured to stored only a single profile P1.

The profiles may be downloaded through remote protocol (OTA) after card issuance; profiles may also be deleted. Alternatively, the profiles can be downloaded locally by the so-called production machines, which produce a batch of integrated circuit cards, in particular SIM card, and then load in the memory of the card the required profile.

In the above scenario, it is apparent that in a mobile device or a mobile communication module, having (pre)installed the above described multi-subscription SIM module in the form of an embedded SIM module, e.g. a eUICC, such eUICC card cannot be moved to another mobile devices.

In the current generation of mobile devices, in particular mobile phones, the Buicks are property of the mobile operator. In the next generation of mobile phones, which includes a soldered eUICC or an iUICC, i.e. integrated UICC, the mobile operator does not own the whole card, but rather owns a profile on the eUICC, which means substantially owning only a small part of the memory of the eUICC.

With conventional UICCs, e.g. not eUICC or iUICC, users however often have more than one mobile phone per UICC card. The profile however is permanently stored on only one eUICC, making impossible for the user to switch mobile phone on a daily basis.

Reasons that can induce a user to switch mobile phone include that modern smartphones are even more prone to breakage, due e.g. to the big display or the aluminum case, and in case of breakage of a smartphone equipped with an eUICC the user would be required to reach/call the operator in order to download the profile on another mobile phone (e.g. a backup phone).

Also, users tend to change smartphone frequently these days to obtain new features, while with the IoT (Internet of Things) spreading out, many devices are being enabled to access 4G connectivity.

However, given these growing necessities, the only solutions currently available in order to have a same profile on another new terminal or mobile device, requires that the end user calls a customer agent of the operator in order to download the profile again on the new terminal or device. This is of course lengthy and complicated for the user.

Embodiments of the present disclosure relate in particular to the technical context of Remote SIM Provisioning technology, also known as the Embedded UICC (Universal Integrated Circuit Card).

Embodiments moreover concerns a related system as well as a corresponding related computer program product, loadable in the memory of at least one computer and including software code portions for performing the steps of the method when the product is run on a computer. As used herein, reference to such a computer program product is intended to be equivalent to reference to a computer-readable medium containing instructions for controlling a computer system to coordinate the performance of the method. Reference to "at least one computer" is evidently intended to highlight the possibility for the present disclosure to be implemented in a distributed/modular fashion.

The present disclosure provides embodiment methods for sharing the same profile on different integrated circuit cards, including the operations of in a plurality of mobile devices configured to operate with a mobile communication network and having each stored during a setup phase a given profile, which is enabled for operation on only one currently enabled mobile device in the plurality of devices; performing a procedure enabling the given profile on mobile device to be enabled in the plurality of devices different from the currently enabled mobile device; performing a network attach procedure including sending at least a identifier information of the mobile device to be enabled comprising at least subscriber information, to the mobile network; performing a mobile device authentication procedure between the mobile network and the mobile device to be enabled; performing in the mobile network on the basis of the received identifier information a location update operation using the identifier information of the mobile device to be enabled, the location update operation comprising performing cancellation of the location of the currently enabled mobile device.

In variant embodiments, the sending identifier information includes sending to a node configured to manage subscribers currently present in a given service area in which is positioned the mobile device to be enabled, in particular a MME or Visitor Location Register, and to a node storing the authentication data for a mobile device authentication procedure between the mobile network and the mobile device to be enabled, in particular a HSS or Authentication Center. The location update operation includes updating at the node storing authentication data, on the basis of the received identifier information with the location corresponding to mobile device to be enabled, and providing updated authentication data to the node configured to manage subscribers currently present in a given service area in which is positioned the new mobile device.

In variant embodiments, the setup phase includes providing a given profile on all the devices of the user, and enabling the given profile on only one device in the plurality the mobile devices 10₁ . . . 10p.

In variant embodiments, the procedure enabling the given profile on a new mobile device in the plurality of devices includes sending a request to the new mobile device a request to enable the profile on such new mobile device, sending an enable profile request from the new mobile device to the integrated circuit card to enable the given profile for operation, and enabling at the card the given profile.

In variant embodiments, the identifier information includes a device identifier and a subscriber identifier of the other mobile device.

In variant embodiments, the identifier information includes a subscriber identifier of the other mobile device and a subscriber identifier of the currently enabled device.

In variant embodiments a database is maintained in the node storing authentication data, comprising the authentication data, the database, being provided with the addition in each its record corresponding to a subscriber identifier of a field corresponding to the device identifier of the currently enabled mobile device.

In variant embodiments, the cancellation of the location of the currently enabled mobile device includes registering a ISD-R of the card of the currently enabled to the network rejection event, sending a cancellation message through the node configured to manage subscribers to the currently enabled mobile device, sending a rejection event from the device to the card upon receiving the rejection message, and disabling through the ISD-R of the card the currently enabled profiled upon receiving the rejection event.

In variant embodiments, the mobile communication network is a LTE network.

In variant embodiments, the integrated circuit card is an eUICC card.

Embodiments of the present disclosure also provide solutions regarding a system for sharing a same profile on different integrated circuit cards, including in a plurality of mobile devices having stored in respective integrated circuit cards a given profile enabled for operation on only one device in the plurality of devices and a mobile communication network with which the plurality of mobile devices is configured to operate, the system being configured to implement the method of any of the previous embodiments.

The present disclosure provides also solutions regarding an integrated circuit card configured to operate in the system above.

Embodiments of the present disclosure provides also solutions regarding a computer-program product that can be loaded into the memory of at least one processor and comprises portions of software code for implementing the method according to any of embodiments of the method described above.

Figure 5:
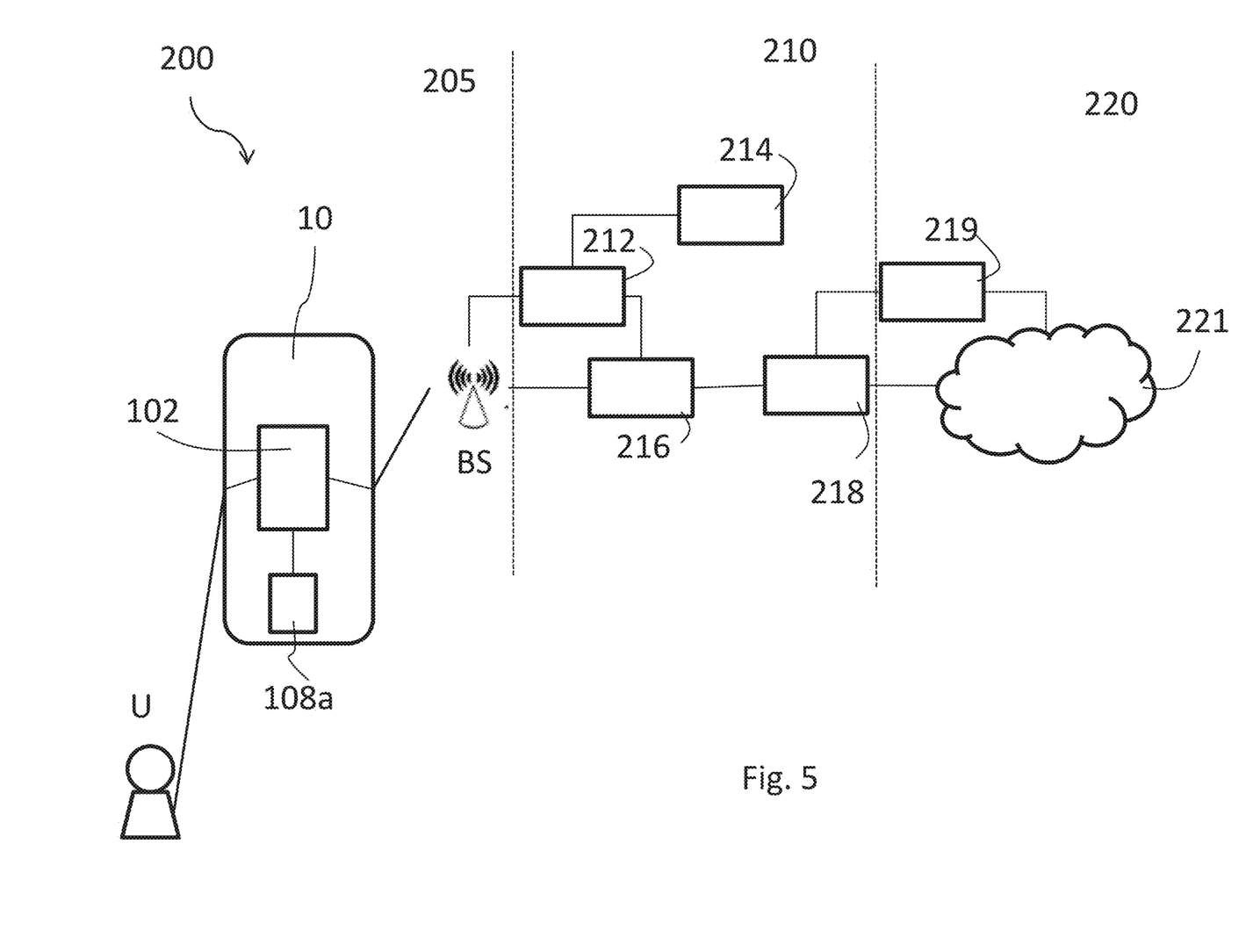
FIG. 5 shows an architecture of a communication system in which is applied the method here described.

FIG. 5 illustrates the architecture of a mobile communication network 200, specifically a LTE/SAE (Long Term Evolution/System Architecture Evolution) architecture, in which the method here described operates. This architecture includes the mobile device 10, or user equipment, to which a user U can access. The mobile device 10 includes the integrated circuit card 108, which is a preferably an eUICC SIM card. In variant embodiments can be a multisubscription eUICC card 108a, but also a simple, not embedded, UICC card or integrated circuit card. The integrated circuit card 108 is configured to communicate with a radio access network 205, including a radio access node represented for the LTE by eNodeB (evolved NodeB) BS. The eNodeB BS is the element in E-UTRAN, e.g. the radio access network of LTE, which is the evolution of the radio access node represented by Node B in UTRA, the radio access network of UMTS, or the base station in GSM. The eNodeB BS is the hardware element that is connected to the mobile phone network that communicates directly wirelessly with mobile handsets 10, like a base transceiver station (BTS) in GSM networks. The mobile device 10 accesses through an E-UTRAN Uu interface (LTE Uu), however for further details regarding the interfaces between entities and nodes of the LTE and their operation reference can be made to LTE 3GPP TS 36.XXX specification series Release 8.

The eNodeB BS accesses a core network 210 of the LTE network, in particular access an entity 212 configured to manage subscribers currently present in a given service area in which is positioned the mobile device pertaining to a radio access node, e.g. eNodeB BS, which in LTE is specifically the MME (Mobility Management Entity) node 212, by a respective interface. The MME node 212 represents the key control-node for the LTE access network. It works in conjunction with the evolved NodeB (eNodeB) BS and a Serving Gateway 216 within the EvolvedPacket Core (EPC), or LTE/SAE core network.

The MME node 212 is also responsible for authenticating the user by interacting with a HSS (Home Subscriber Server) 214. The MME node is also responsible for generation and allocation of temporary identities, such as TMSI (Temporary Mobile Subscriber Identity), to user equipments, e.g. mobile devices 10, present in a service area served by the eNodes associated to the MME.

In the core network of a GSM/UMTS network the entity configured to perform mobility management corresponds instead to a Mobile Switching Center, which registers users to a database in the Visitor Location Register and authenticates the devices in cooperation with the Home Location Register. The Visitor Location Register 212 contains the exact location of all mobile subscribers currently present in the service area of the Mobile Switching Center. This information is necessary to route a call to the right base station.

The Home Subscriber Server 214 contains users' subscription data, in particular SAE subscription data such as the EPS-subscribed QoS (Quality of Service) profile and any access restrictions for roaming. In addition the HSS 216 holds dynamic information such as the identity of the MME 212 to which the user U is currently attached or registered. The HSS 214 may also integrate the authentication center (AUC), which generates the vectors for authentication and security keys.

The Serving Gateway 216 is then coupled to a Packed Data Network Gateway 218 which allows access to an interconnect network 220 which may include a Public Switched Telephone Network ("PSTN") or the Internet 221, as shown in the figure. The Packed Data Network Gateway 218 access also a Policy and Charging Rules Function node 219, interconnected by a respective interface to the interconnect network 220, which manages the service policy and sends QoS setting information for each user session and accounting rule information.

Other details of the LTE/SAE network, which, as mentioned is known per se, can be found in the 3GPP TS 36.XXX specifications.

In the LTE/SAE the following identifiers are used:

IMSI (International Mobile Subscriber Identity): a unique subscriber identifier that identifies each mobile subscriber in every GSM, UMTS. EPS system;

TMSI (Temporary Mobile Subscriber Identity): a temporary subscriber identifier which has only local significance in VLR/SGSN/MME. The TMSI identifier is used instead of IMSI to protect subscriber from being identified;

GUMMEI (Globally Unique MME Identifier): Unique identifier of the MME; and

GUTI (Globally Unique Temporary Identity): a combined identifier which provide unambiguous identification of the subscriber without revealing the IMSI. The GUTI identifiers consist of the identifier of the MME, GUMMEI, and of the TMSI (which uniquely identifies the subscriber inside the MME 212).

Figure 6:
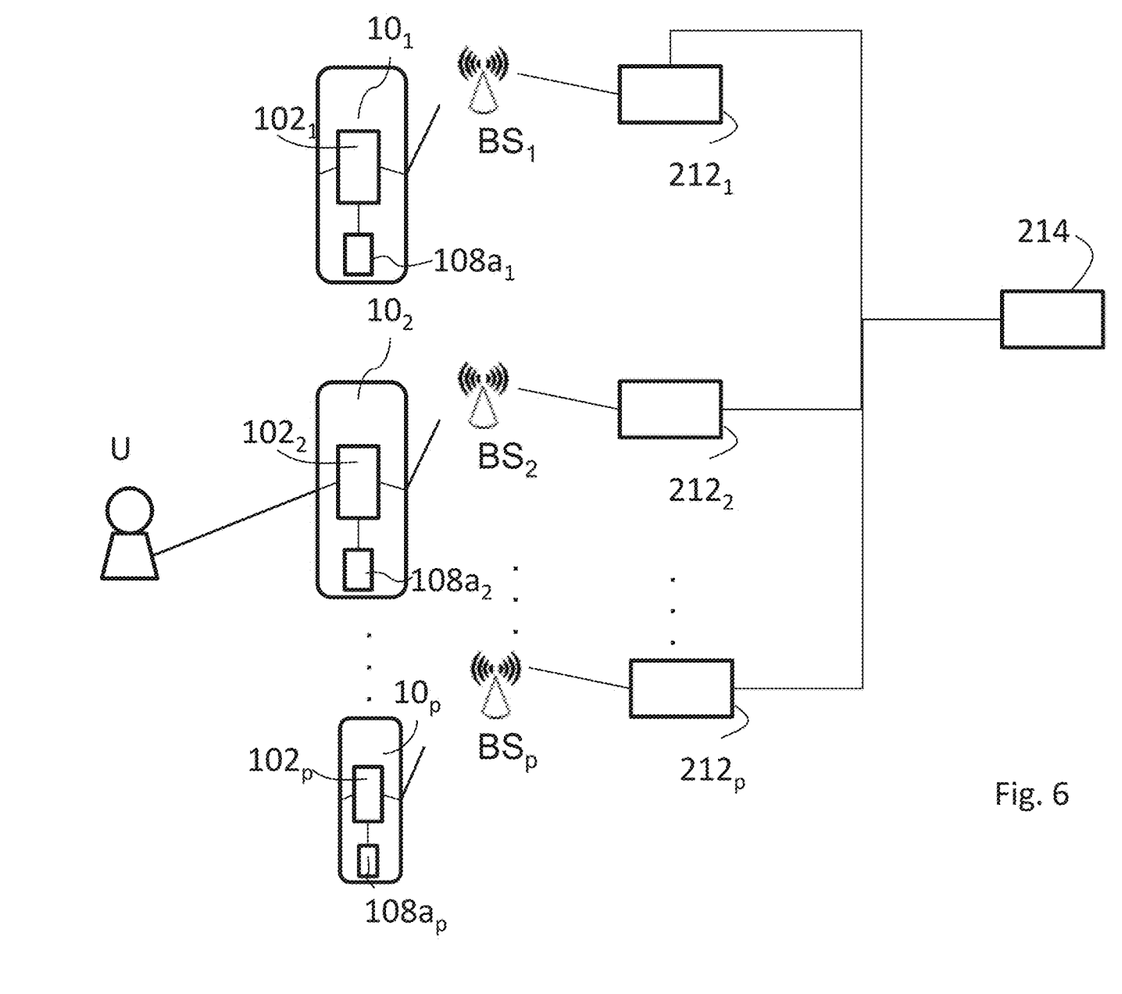
FIG. 6 shows partially an embodiment of architecture of a communication system in which is applied the method here described.

FIG. 6 illustrates a schematic diagram representing partially the mobile network of FIG. 5, in which a user U has a number p of mobile devices $10_1 \ldots 10_p$, on which a given profile P1 is loaded. Each of the mobile devices $10_1 \ldots 10_p$ has a respective integrated card, preferably an eUICC, $108a_1 \ldots 108a_p$ on only one of the mobile devices $10_1 \ldots 10_p$, and is shown associated with a respective eNodeB $BS_1 \ldots BS_p$ which in its turn is associated to a respective MME $212_1 \ldots 212_p$, such that MME $212_1 \ldots 212_p$ communicates with a same HSS 214 in the core network.

Figure 7:
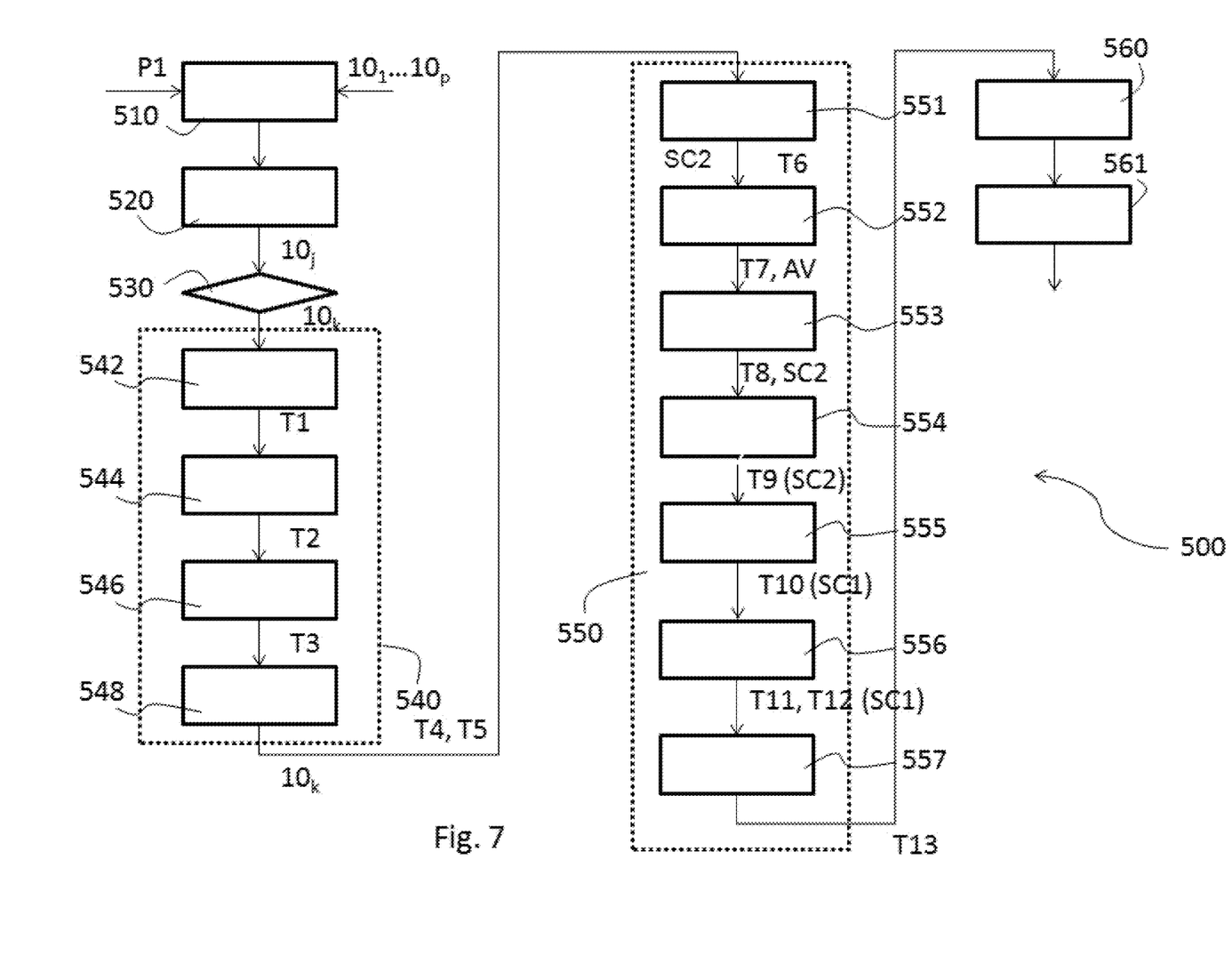
FIG. 7 shows a flow diagram representing an embodiment of the method here described.

FIG. 7 shows a flow diagram representing an embodiment of the method sharing a same profile on different integrated circuit cards here described, indicated as a whole by the numerical reference 500. These different integrated circuit cards are different UICC cards 108*j*, in particular SIM cards of a user/subscriber U which has, as shown in FIG. 6, a plurality of mobile devices $10_1 \ldots 10_p$, where p is the number of mobile devices, e.g. one or more smartphone and/or tablet and/or other mobile communication module, also a IoT device, usually to be used in embedded systems.

The method 500 includes a first operation 510 of providing, in particular downloading a given profile, for instance the profile P1, on all the devices $10_1 \ldots 10_p$ of the user U. This is preferably performed at the time of the contract subscription with the mobile network operator MNO.

Then an operation 520 of enabling the profile P1 on only one of the mobile devices $10_1 \ldots 10_p$, indicated as the j-the device $10_j$, j=1 . . . p, is performed, so that the enabled device $10j$ is enabled for connection to the mobile network according the data in such profile P1.

Operations 510 and 520 thus define a setup procedure, or setup phase of the mobile devices $10_1 \ldots 10_1$, in which a profile P1 to be shared among such mobile devices $10_1 \ldots 10_p$ is loaded on all the mobile devices $10_1 \ldots 10_p$, but enabled on only one of them, e.g. currently enabled device $10_j$.

Then, in the block 530 is indicated the occurring of a condition in which the user U desires using, i.e. enabling, another of the mobile devices $10_1 \ldots 10_p$, e.g. another smartphone or IoT device, e.g. a new device $10_k$, k different from j. In this case, a profile enable procedure 540 is started on the new device, or device to enable, $10k$.

Such profile enable procedure 540 and a network attach procedure 550 described in the following are described also with reference to the sequence diagram of FIG. 8, which represents actions T1 . . . T10 performed by some of the objects or nodes of the mobile communication network 200 schematically represented in FIG. 5.

Profile enable procedure 540 includes step 542 in which the user U sends to the new device $10_k$ a request T1 to enable the profile P1 on such new device $10_k$. The request T1 is in particular sent to the LPA (Local Profile Assistant), which is a software running in the mobile device $10_k$, which provides LPA services, such as Profile download or Profile management, to the eUICC card $108a_k$. The LPA consists of two parts—the LPD (Local Profile Download), which operates as a proxy for the efficient download of a profile package between for instance a Subscription Manager Data Preparation server and the eUICC card 108, and the LUI (Local User Interface) which allows for local profile management on the device by the user U. Thus in step 542 the user U indeed interacts with the LUi interface, e.g. by operating with the user interface of the new mobile device $10_k$.

Then, in a step 544, at the new mobile device $10_k$ the LPA sends an enable profile APDU, corresponding to an enable profile request T2, to the eUICC card $108a_k$ to enable the selected profile, i.e. profile P1. As shown in FIG. 3 one or more profiles, like profile P2, can be present in the card 108. Step 546 is then performed at the card 108, which includes the action T3 of enabling the selected profile P1.

Subsequently, in step 548, the new mobile device $10_k$ launches a network attach procedure 550, using the baseband firmware, sending an attachment request T4, using the second subscriber identifier SC2, to the corresponding eNodeB $BS_2$, which in turn forwards a corresponding attachment request T5 to the associated node MME, i.e. the second MME $212_2$.

The network attach procedure 550 includes a step 551 in which the second MME $212_2$ asks the HSS 214 new authentication vectors sending an Authentication Info Request T6 indicating the new subscriber identifier SC2 in the Authentication Info Request, receiving in a subsequent step 552 an Authentication Info Response T7 including the Authentication Vectors AV related to the new subscriber identifier SC2.

The second MME $212_2$ then in step 553 sends an Update Location Request T8 to the HSS 214 with the second subscriber identifier SC2 as an argument, asking to update the location with the location associated to the device holding the second subscriber identifier SC2. As mentioned, the MME preferably does not send the IMSI as subscriber identifier SC2, but instead the TMSI. Indeed the IMSI may be shown at the first attach, then once the GUTI is obtained, this is preferably used as identifier, since it is univocal having the MME identifier and the TMSI pertaining that MME. Thus if an entity does not recognize the GUTI, the corresponding MME is contacted to obtain the IMSI corresponding to the TMSI. Since there are two mobile devices $10_j$ and $10_k$, and this would mean two GUTI to manage as just described, it could be accepted as an alternative that the first attach of the mobile device $10k$ is performed with its IMSI instead of its old GUTI. In variant embodiments first the mobile device $10_k$ tries with the GUTI the attach, then, if not recognized, uses the GUTI.

In a step 554 the HSS 214 performs the requested update and replies with an Update Location Response T9. The HSS 214, since it is the master database in which the subscriber identifiers are stored, is configured to store also different alias subscriber identity SC1, SC2, . . . SCp and their status of alias of a same subscriber identity. So the HSS 214 is configured to recognize that subscriber identifiers SC1 and SC2 are alias of a same subscription SC referring to a given profile P. If the HSS 214 receives an authentication request, e.g. Authentication Info Request T6, and a location update request, e.g. Update Location Request T8 from a subscriber identifier, e.g. IMSI2, which is registered in the HSS 214 as alias of a subscriber identifier, in step 555 the HSS 214 signals to the current MME $212_1$ associated to the current mobile device $10j$, that another device $10_i$ has "stolen" the connection. This may for example be signaled using a Cancel Request message directed to the MME $212_1$, using as Cancellation Request field either a new defined one, or one of the well-known values (e.g. SUBSCRIPTION_WITHDRAWAL). It is underlined that it may be possible that the first MME $212_1$ corresponds to the second MME $212_2$ (e.g. in case the mobile devices $10_j$ and $10_k$ are connected to the same cell). The HSS 214 is therefore configured to handle this possibility.

The first MME $212_1$, upon reception of the latter cancellation message T10, is configured to signal to the current mobile device $10_j$ that the connection was stolen by the new mobile device $10_k$. This performed by sending 556 a reject message T11, in the case of E-UTRAN here exemplified an Attach Reject message T11, or TRACKING AREA UPDATE REJECT message. In variant embodiments, in the case of GERAN/UTRAN a LOCATION UPDATING REJECT message or a GPRS ATTACH REJECT message or a ROUTING AREA UPDATE REJECT message (as defined in TS 24.008 [9]) is sent. The Attach Reject Message T10 is sent to the eNodeB $BS_1$ of the current device $10j$, which in turn forwards a corresponding Attach Reject Message T12 to the currently enable mobile device $10_j$. During each attach procedure, the current MME may choose small time values for some timer in order to receive adequately frequent attach/update messages from the mobile equipment. For example the current MME may choose a sufficiently small value for the timer T3412 in order to receive at adequate times ROUTING AREA UPDATE messages. Each ROUTING AREA UPDATE message from the mobile equipment, may follow a cancellation message T10, and may trigger for this reason a ROUTING AREA UPDATE REJECT message.

In other embodiments, a proprietary message may be used to signal to the mobile equipment $10j$ that a Network Rejection event must be sent to the card $108a_j$.

Once the reject message is received by the currently enabled mobile device $10_j$, based on ETSI TS 131 111 a network rejection event is triggered in its card $108a_j$.

Since the ISDR of the card $108aj$ is registered to the network rejection event, an ENVELOPE (EVENT DOWNLOAD—Network Rejection Event) APDU T13 containing the event is sent 557 to the first card $108a_j$.

The Java Card operating system of the currently enabled card $108a1$, once received the event, triggers in a step 560 the processToolkit( ) function of the ISD-R of the first card $108a1$.

Each ISD-R of each integrated card, in particular in this case of the first card $108a_1$, interprets a network rejection event that occurred after a normal service (i.e. the phone was correctly connected to the network and then the network rejected it) as the fact that some other mobile equipment has taken the subscription. Once this situation occurs, the ISD-R of the integrated card, in this case $108a_1$, disables in a step 561 the currently enabled profile. Therefore, at the end of the procedure described the second integrated card $108a_2$ has correctly taken the subscription corresponding to a certain profile, e.g. P1, from the first card $108a_1$ and such profile is correctly enabled and working only on the second card $108a_2$.

Figure 8:
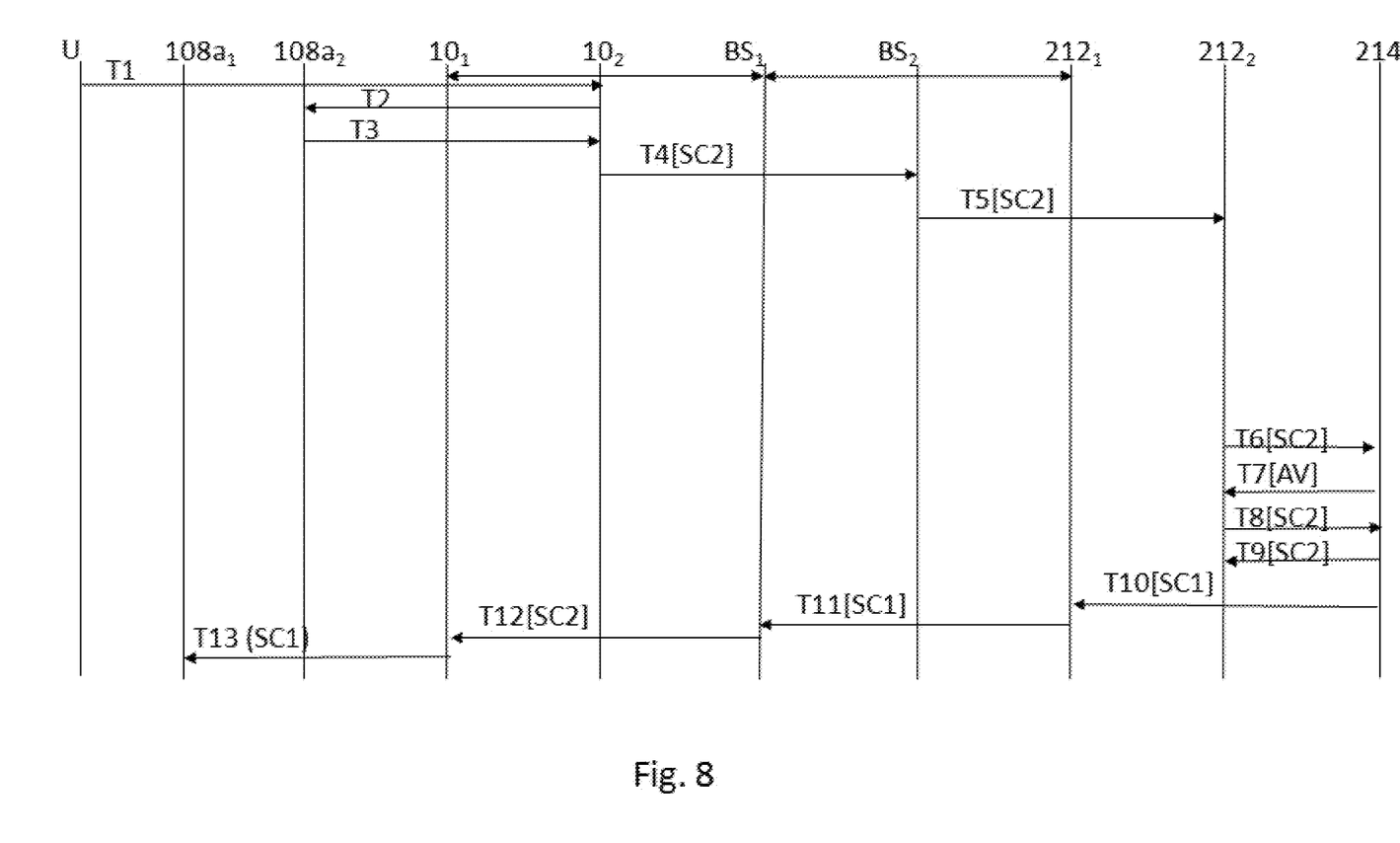
FIG. 8 shows a sequence diagram representing action and signals exchanged between nodes of the system of FIG. 5 according to a first embodiment of the method here described.

The solution here described provides thus that a same profile is in at least two integrated cards, in particular eUICC, in particular with reference to the example of FIG. 8, indicated with $108a_1$ and $108a_2$. The only difference is that the two profiles in the two integrated cards $108a_1$ and $108a_2$ have different subscriber identifiers, IMSI, indicated as SC1 and SC2 respectively.

The two different values of the subscriber identifiers SC1 and SC2 associated are used by the mobile network to identify which of the cards $108a_1$ and $108a_2$ is currently connected to the mobile network.

FIG. 8 shows a sequence diagram representing the actions and signals exchanged between the nodes of the mobile communication network 200 of FIG. 5 according to the method here described. This diagram shows nodes or objects the user U, the current or first mobile device $10_1$, the new mobile device $10_2$, the respective UICC cards $108a_1$ and $108a_2$, the respective MME $212_1$ and $212_2$ and the HSS 214. As shown, profile is initially enabled on the integrated card $108a_1$.

The user U, by means e.g. of the eUICC User Interface (e.g. LUI in eUICC Consumer) in its other mobile equipment $10_2$, performs the action T1 of enabling the profile (step 520), the second mobile device $10_2$ sends the Enable Request T2 (step 541) to the second integrated card $108a2$ which confirms replying an Enable Response T3 (step 543).

Then, the second mobile device $10_2$ launch the attach request T4 (step 544), relayed by the eNodeB BS1 to the respective MME $212_2$ triggering the attach procedure 550, which includes an authentication portion (actions T6, T7) which is performed using, as in the previous actions or messages T4, T5 (steps 551, 552), the subscriber identity of the new or second mobile device $10_2$, SC2, so that the new or second mobile device $10_2$ is authenticated by the HSS 214, and includes a location update portion, using actions T8, T9, still with the subscriber identity of the new or second mobile device $10_2$, SC2 as an argument.

Then, the cancel location procedure is performed (action T10, step 555) which generates rejection messages T11 from the MME to the BS and T12 from the BS to the mobile device $10_1$ (step 556) Messages of actions T10, T11, T12 have as argument the subscriber identity of the current enabled or first mobile device $10_1$, SC1.

The action T13 is performed internally at the first mobile device $10_1$ (step 557). Steps 560 and 561 which involve the ISD-R of the first card $108a_1$ are not represented here.

Figure 9:
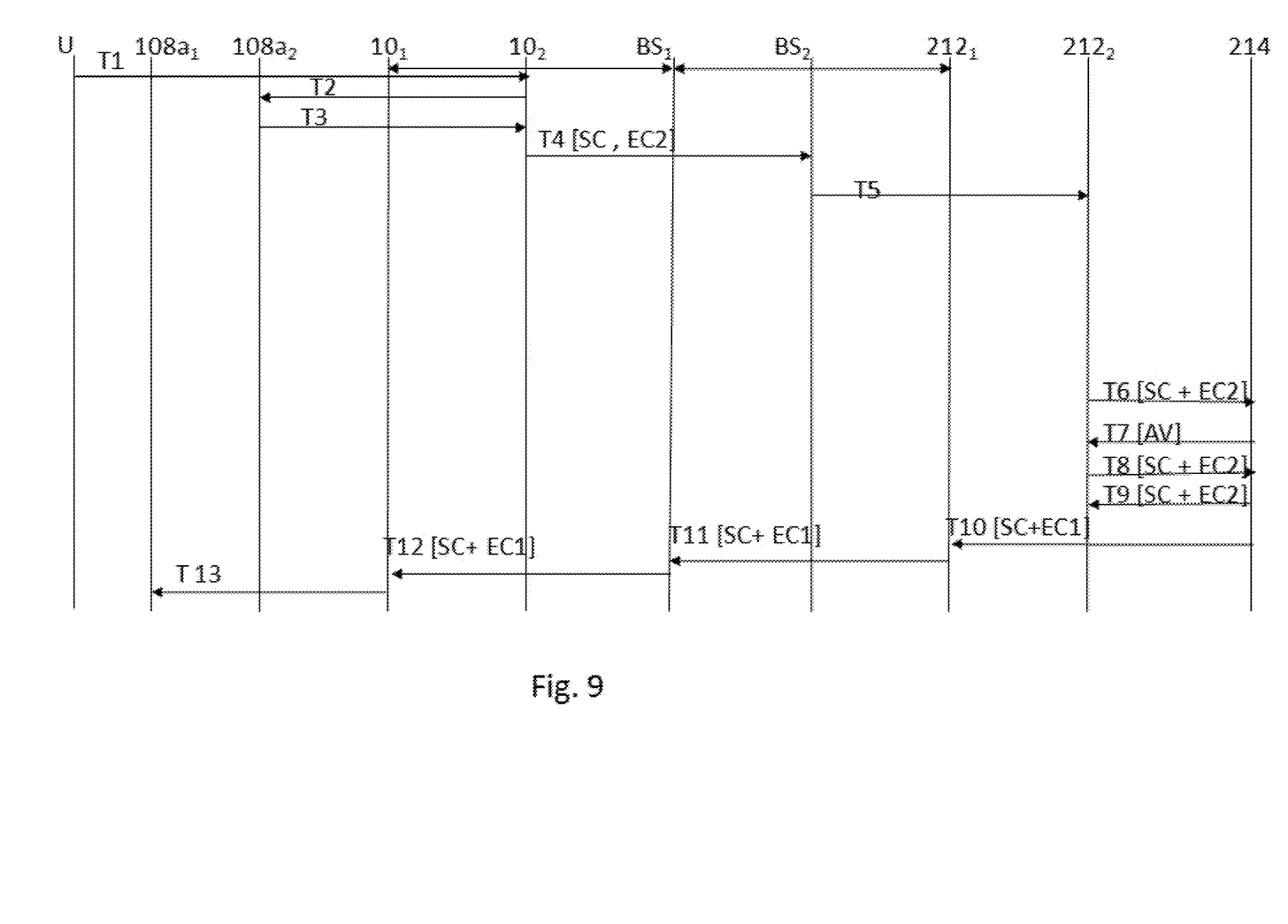
FIG. 9 shows a sequence diagram representing action and signals exchanged between nodes of the system of FIG. 5 according to a second embodiment of the method here described.

In a sequence diagram shown in FIG. 9 describes a variant embodiment, in which instead of using the first subscriber identity SC1 and the second subscriber identity SC2, i.e. two IMSI values which are assigned to a same profile installed over several user equipment $10_1 \ldots 10_p$ to differentiate them, the equipments $10_1 \ldots 10_p$ are differentiated by using their device identity EC, e.g. the IMEI code, which represents an unique identifier of the user equipment $10i$. The IMEI code is currently mainly used to block stolen phones, i.e. each operator maintains a black list of IMSI which are not allowed to connect to the network.

To do this, the IMEI code, i.e. identity EC of the new device, the second device 102 in the example, so EC2, must be sent along with the, sole, subscriber identity SC, e.g. the IMSI of the user U, in each attach message, thus slightly modifying the network protocols.

Once the HSS 214 receives an authentication info request from the second MME2, it understands that a new device is trying to connect to the network (because currently the device with the first device identity EC1 is connected using the profile identified by the subscriber identity SC).

Thus, a method for sharing a same profile on different integrated circuit cards, includes the operations of: in a plurality of mobile devices $10_j \ldots 10_p$ configured to operate with a mobile communication network 200, e.g. LTE network or UMTS network, and having each stored during a setup phase 510, 520 a given profile P1, which is enabled for operation on only one currently enabled mobile device $10_j$ in the plurality of devices $10_1 \ldots 10_p$; performing a procedure 540 enabling the given profile P1 on a new mobile device to be enabled $10k$ in the plurality of devices $10_1 \ldots 10_p$ different from the currently enabled mobile device $10_j$, by such enabling of the profile the connection is taken or "stolen" by the new device $10_k$; performing a network attach procedure 550 including sending 551 at least an identifier information SC2 or SC, EC2 of the mobile device to be enabled $10_k$ comprising at least subscriber information, to the mobile network 200, i.e. or a subscriber identifier, the IMSI of new device $10k$ alias of the IMSI of the enabled device $10_k$, are sent as identifier information, or a subscriber identifier and a device identifier of the mobile device to be enabled $10_k$, i.e. the IMSI and the IMEI, performing 552 a mobile device authentication procedure between the mobile network 200 and the mobile device to be enabled ($10_k$); this obtains authentication vectors AV for the node 212; and performing 553 in the mobile network 200 on the basis of the received identifier information a location update operation using the identifier information of the mobile device to be enabled $10k$, for example the TMSI/GUTI or the IMSI, the location update operation comprising performing cancellation 555 of the location of the currently enabled mobile device $10_j$.

Operations 510 and 520 define a setup procedure, or setup phase of the mobile devices $10_1 \ldots 10_p$, in which a profile P1 to be shared among such mobile devices $10_1 \ldots 10_p$ is loaded on all the mobile devices $10_j \ldots 10_p$, but enabled on only one of them.

The operation of sending identifier information of the new mobile device includes sending 551 to the node 212 configured to manage subscribers currently present in a given service area in which is positioned the mobile device to be enabled $10_k$, in particular a MME for TE or Visitor Location Register for UMTS, and to a node 214 storing the authentication data, authentication vectors AV, for a mobile device authentication procedure between the mobile network 200 and the mobile device to be enabled $10_k$, in particular a HSS for LTE or a Authentication Center node for UMTS; the node 212 sends in particular a authentication request in the operation 551 to the node 214.

The location update operation 553 includes updating at the node 214 storing authentication data, on the basis of the received identifier information with the location corresponding to mobile device to be enabled $10k$, and providing updated authentication data AV, the authentication vectors, to the node 212 configured to manage subscribers currently present in a given service area in which is positioned the new mobile device $10_k$.

Such authentication data include keys for encryption such as at least an Authentication key K a and sequence number SQN needed for the authentication of the mobile equipment encryption keys K, SQN, provided in records for each IMSI identifiers SC in a database.

The cancellation 555 of the location of the currently enabled mobile device $10_j$ includes registering a ISD-R of the card $108aj$ of the currently enabled to network rejection event; sending 556 a cancellation message, e.g. rejection message, through the node 212 configured to manage subscribers to the currently enabled mobile device $10_j$, this being originated by the location cancellation command issued by the node 214 for such currently enabled mobile device $10_j$; sending 557 a rejection event T13 from the device to the card upon receiving the rejection message; and disabling through the ISD-R of the card the currently enabled profiled upon receiving the rejection event T13.

As mentioned, although the method has been described here with reference to LTE networks, it can be implemented as well in UMTS networks and GMS networks or other networks comprising a corresponding nodes or entities as required by the solution as claimed.

An advantage of embodiment methods and systems includes the ability for users to switch mobile phones on the fly, even in case of mobile phone breakage. Some advantageous embodiments make it easy to share an internet connection with an IoT device, e.g. sharing the connection with the car when driving. This can be useful in autonomous cars, i.e. self-driving cars. In some embodiments, there is no need for multiple subscriptions for different tasks. Sharing connection may even be easier than inserting a SIM. Some embodiments allow for operators can charge the number of mobile equipment where the profile is loaded.

Of course, without prejudice to the principle of the invention, the details of construction and the embodiments may vary widely with respect to what has been described and illustrated herein purely by way of example, without thereby departing from the scope of the present invention, as defined by the ensuing claims.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:
performing a profile enable procedure for a first profile on a first mobile device, wherein the first profile is stored on the first mobile device and on a second mobile device, and wherein the first profile is disabled on the first mobile device and enabled on the second mobile device prior to performing the profile enable procedure; and
after the profile enable procedure is performed, performing a network attach procedure comprising
receiving, by a mobile network, an attach request comprising identifier information from the first mobile device, wherein the identifier information comprises subscriber information, and
in response to receiving the attach request,
performing a mobile device authentication procedure between the first mobile device and the mobile network, and
performing by the mobile network, a location update operation using the identifier information including the subscriber information, wherein the location update operation comprises performing a cancellation of a location of the second mobile device, wherein a connection is maintained between the mobile network and the first mobile device operating with its first profile at least from a time of the attach request until after performing the cancelation of the location of the second mobile device.

2. The method according to claim 1, wherein:
receiving the identifier information comprises receiving the identifier information by a first node configured to manage subscribers currently present in a given service area where the first mobile device is positioned, and sending the identifier information to a second node storing authentication data for the mobile device authentication procedure; and
performing the location update operation comprises updating location information of the first mobile device at the second node based on the identifier information, and providing updated authentication data to the first node.

3. The method according to claim 2, wherein:
the first node comprises a Mobility Management Entity (MME) or a Visitor Location Register (VLR); and
the second node comprises a Home Subscriber Server (HSS) or an Authentication Center.

4. The method of claim 1, further comprising:
providing the first profile to the first mobile device and the second mobile device prior to performing the profile enable procedure; and
enabling the first profile on the second mobile device prior to performing the profile enable procedure on the first mobile device.

5. The method according to claim 1, wherein performing the profile enable procedure further comprises:

sending to a processor of the first mobile device, a request to enable the first profile;

transferring an enable profile request from the second mobile device to an integrated circuit card of the first mobile device to enable the first profile for operation; and enabling the first profile on the integrated circuit card.

6. The method according to claim 1, wherein the identifier information includes a device identifier and a subscriber identifier of the first mobile device.

7. The method according to claim 1, wherein the identifier information includes a subscriber identifier of the first mobile device and a subscriber identifier of the second mobile device.

8. The method according to claim 7, wherein
a database comprising authentication data is maintained in a node of the mobile network storing authentication data; and
the database comprises a record associating the subscriber identifier of the second mobile device with a device identifier of the second mobile device.

9. The method according to claim 7 wherein:
performing the cancellation of the location of the second mobile device comprises:
registering an Issuer Secure Domain Root (ISD-R) of an integrated circuit card of the second mobile device to a network rejection event,
sending a cancellation message from a node of the mobile network configured to manage subscribers to the second mobile device,
sending the network rejection event from a processor of the second mobile device to the integrated circuit card of the second mobile device receiving cancelation message,
disabling the first profile on the second mobile device via the ISD-R of the integrated circuit card of the second mobile device receiving the network rejection event by the integrated circuit card of the second mobile device.

10. The method according to claim 1, wherein the mobile network is an LTE network.

11. The method according to claim 1, wherein:
the first profile is stored on an integrated circuit card of the first mobile device;
and the integrated circuit card of the first mobile device comprises an embedded Universal Integrated Circuit Card (eUICC).

12. A non-transitory machine readable medium having stored thereon a program having a program code for performing the method of claim 1, when the program is executed on at least one processor.

13. A method, comprising:
after a first profile is enabled on a first mobile device, receiving an attach request from the first mobile device, wherein the attach request comprises identifier information and the identifier information comprises subscriber information;
authenticating the first mobile device in response to the attach request;
after authenticating the first mobile device updating a location associated with the identifier information from a location of a second mobile device having the same first profile stored thereon to the first mobile device;
canceling the location of the second mobile device; and
maintaining a connection with the first mobile device operating with the first profile at least from a time of the attach request until after canceling the location of the second mobile device.

14. The method of claim 13, wherein the identifier information includes a device identifier and a subscriber identifier of the first mobile device.

15. The method of claim 13, wherein:
enabling the first profile on the first mobile device comprises sending a request to enable the first profile on the first mobile device; and
the method further comprises transferring an enable profile request from the second mobile device to an integrated circuit card of the first mobile device to enable the first profile for operation.

16. A non-transitory machine readable medium having stored thereon a program having a program code for performing the method of claim 13, when the program is executed on at least one processor.

17. A method of operating a first mobile device, comprising:
enabling a first profile on the first mobile device, wherein the first profile is stored on the first mobile device and on a second mobile device, and wherein the first profile is disabled on the first mobile device and enabled on the second mobile device prior to enabling the first profile on the first mobile device;
sending an attach request from the first mobile device to a mobile network, wherein the attach request comprises identifier information and the identifier information comprises subscriber information; and
in response to the attach request, performing a mobile device authentication procedure with the mobile network, wherein a location associated with the identifier information is updated from a location of the second mobile device to the first mobile device, the location of the second mobile device is canceled, the first profile is disabled on the second mobile device, and the mobile network maintains communication with the first mobile device operating with the first profile at least from a time of the attach request until after the location of the second mobile device is canceled.

18. A non-transitory machine readable medium having stored thereon a program having a program code for performing the method of claim 17, when the program is executed on at least one processor.

19. The method of claim 1, wherein performing the cancellation of the location of the second mobile device comprises sending, by the mobile network, a cancelation message to the second mobile device, wherein the second mobile device is configured to disable the first profile via an Issuer Secure Domain Root (ISD-R) of an integrated circuit card of the second mobile device.

20. A method, comprising:
performing a profile enable procedure for a first profile on a first mobile device, wherein the first profile is stored on the first mobile device and on a second mobile device, and wherein the first profile is disabled on the first mobile device and enabled on the second mobile device prior to performing the profile enable procedure;
performing a network attach procedure comprising receiving, by a mobile network, identifier information from the first mobile device, wherein the identifier information comprises subscriber information;
performing a mobile device authentication procedure between the first mobile device and the mobile network; and
performing by the mobile network, a location update operation using the identifier information including the subscriber information, wherein the location update operation comprises performing a cancellation of a location of the second mobile device, wherein performing the cancellation of the location of the second mobile device comprises:
registering an Issuer Secure Domain Root (ISD-R) of an integrated circuit card of the second mobile device to a network rejection event,
sending a cancellation message from a node of the mobile network configured to manage subscribers to the second mobile device,
sending the network rejection event from a processor of the second mobile device to the integrated circuit card of the second mobile device receiving cancelation message,
disabling the first profile on the second mobile device via the ISD-R of the integrated circuit card of the second mobile device receiving the network rejection event by the integrated circuit card of the second mobile device.

* * * * *